April 25, 1939.   W. J. BESLER   2,155,781
RAILWAY TRUCK
Filed Oct. 25, 1935   2 Sheets-Sheet 1
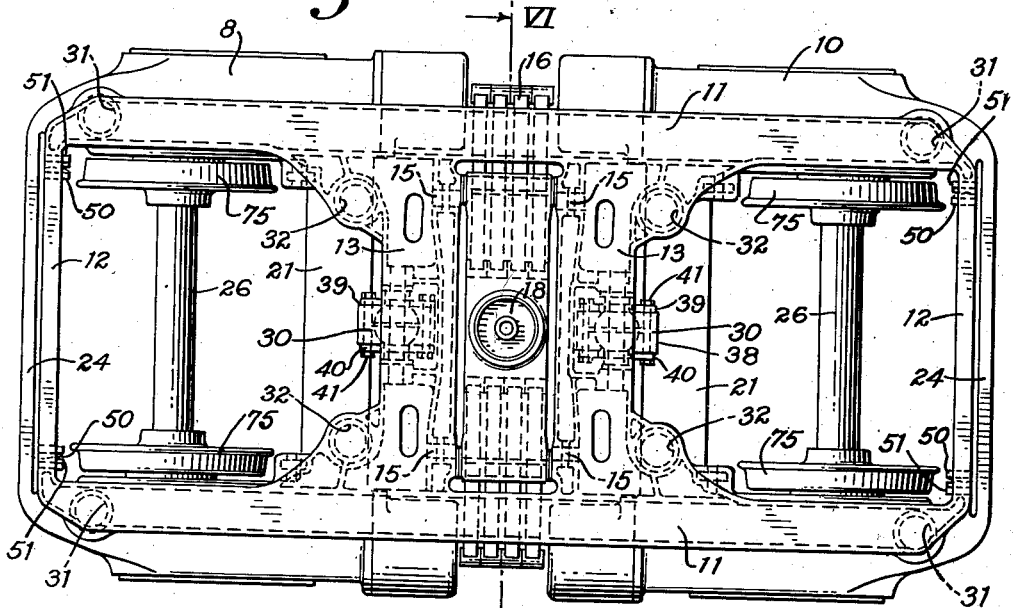
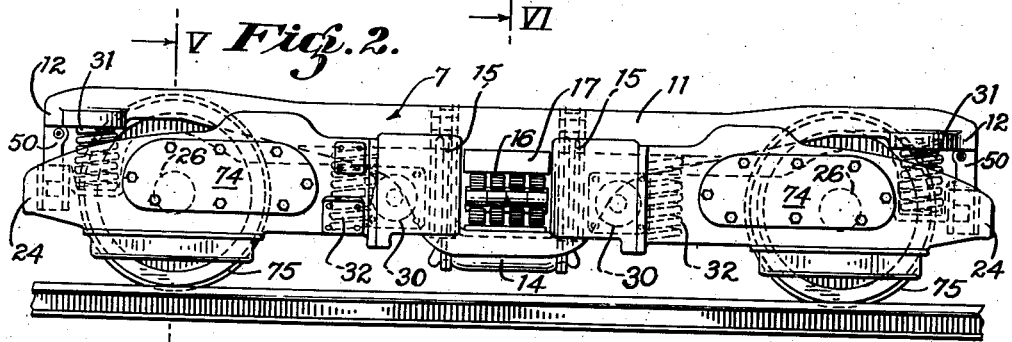
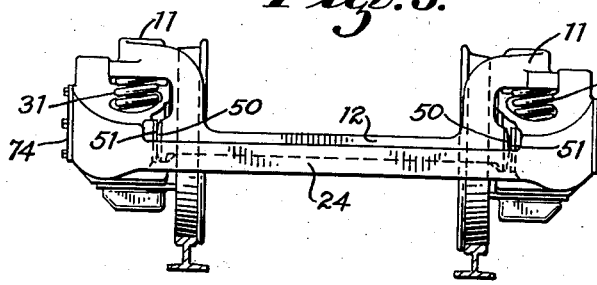
INVENTOR.
William J. Besler
BY
A. Duncan Owen
ATTORNEY.

April 25, 1939.  W. J. BESLER  2,155,781
RAILWAY TRUCK
Filed Oct. 25, 1935  2 Sheets-Sheet 2

INVENTOR.
William J. Besler
BY
A. Denham Olsen
ATTORNEY.

Patented Apr. 25, 1939

2,155,781

UNITED STATES PATENT OFFICE 2,155,781

RAILWAY TRUCK

William J. Besler, Plainfield, N. J.

Application October 25, 1935, Serial No. 46,695

19 Claims. (Cl. 105—133)

This invention relates to power driven motor trucks, and more particularly to reciprocating engine driven motor trucks in which the pistons are directly coupled to the axle on the outside of the wheels.

An object of this invention is to provide an engine truck for railway application which is readily adaptable to existing equipment, such as baggage and passenger cars, the small under frame clearance of which has heretofore prohibited the adaptation of motor drives.

Another object of the invention is to provide a power truck suitable for a variety of applications so that it can be standardized in manufacture. This truck will be suitable for rail cars, high speed stream lined trains, switching engines, and articulated locomotives.

Another object of this invention is to utilize the journal bearings of a truck as the main engine bearings.

Another object of this invention is to secure accessibility by placing all engine parts and cylinders on the outside of the wheels and the truck frame where they can be readily serviced.

Another object of this invention is to utilize the axle as the crankshaft, thereby eliminating gearing, separate crankshafts, crankshaft bearings, and other complications.

Another object of the invention is to secure a simple rugged design with a low center of gravity particularly adapted to high speed service.

Another object of the invention is to secure a completely sealed crankcase containing all moving parts and the journal bearings which can all work in a bath of oil which crankcase also serves as part of the truck sub-frame.

Another object of this invention is to provide an engine assembly in which the sub-frame, cylinders, pistons, valve gear, etc., are semi-sprung by having the engine attachment between the cylinders so that these parts ride with the sprung main truck frame.

Another object of the invention is to provide a power truck which will be low in first cost, economical to maintain, reliable and long lived.

Another object of the invention is to provide a cylinder attachment so that either large or small cylinders may be applied to any of the cylinder positions, thus allowing the engines to be operated as single expansion high pressure engines, or single expansion low pressure engines or compound.

Another object of the invention is to provide a point of engine attachment so that the torque reaction of the engines will produce a force which will be counteracted by the mass of the car and truck body and transfer the up and down force produced by the engine into a horizontal or tractive effort force.

Another object of the invention is to provide standardization and interchangeability of parts and other objects will appear from the following detailed description.

In the accompanying drawings forming a part of this specification, and in which like numerals are employed to designate like parts throughout the same:

Fig. 1 is a plan view of a power truck embodying my invention;

Fig. 2 is a side elevation of the same power truck;

Fig. 3 is an end elevation thereof;

Fig. 7 is a detail of the parts connecting the engine unit to the truck frame.

Figure 4:
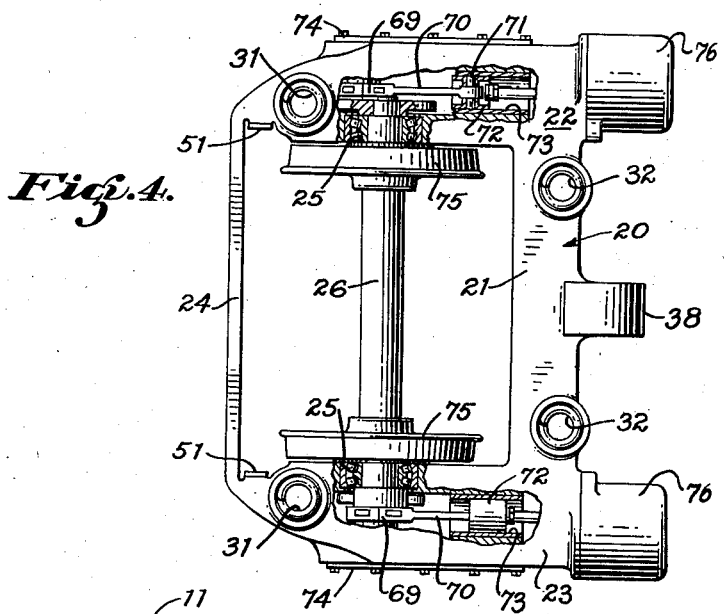
Fig. 4 is a plan view, partially cut away, of an axle and engine unit.

In the drawings, Figs. 1 and 2 show respectively a plan and side elevation view of an engine or power truck embodying my invention. In the following description I shall refer to the power truck as the complete unit shown in Figs. 1 and 2; and to the engine unit as the individual axle and engine assemblies arranged on either end of the power truck (see Fig. 4).

The power truck is comprised of three main units, the truck frame 7, and the engine units 8 and 10. In certain installations one engine unit in the power truck may be sufficient in which event the other end of the truck would have the conventional axle and wheel mounting, well known in railway practice.

The truck frame 7 comprises longitudinal side members 11, connected by the end members 12 and transom members 13. The truck frame is preferably a rigid, integral steel casting, but it may be an assembled frame, formed of individual members which are connected together to form either a rigid or non-rigid structure. The frame members, in the interest of lightweight, are preferably hollow and generally of rectangular cross section to provide ample strength with minimum weight.

A transverse spring plank 14 is suspended from the truck frame by conventional links 15 depending from the transom members 13. Suitable springs 16 are carried by the spring plank for resiliently supporting the truck bolster 17 and the weight of the vehicle frame and body (not shown) which rests on the usual center 18 of the bolster.

Each engine unit might well be described as constituting a C frame. For instance, in Fig. 4 this C frame is shown to comprise a casting 20 having the transverse member 21 and integral with its ends the hollow side frame members or engine units 22 and 23. These latter units are tied at their outer ends by the cross bar 24. Also mounted in this C frame are suitable self-centering bearings 25 for the axle 26.

The C frame may be built up into a unit, or cast as a unit, the latter being the preferable construction. In each C unit is comprised two complete engines, steam, internal combustion, or otherwise, coupled to drive direct to the ends of the axle also mounted therein, and needing only to have conducted to the unit from the vehicle mounted on the power truck, steam in the case of a steam engine, or volatile fluids in the case of an internal combustion engine. I utilize the axle as the crank shaft and thus accomplish a great economy and simplification in every particular.

The C frame thus constitutes the complete twin-engine assembly, with enclosed crank cases 27 which exclude dirt from all the moving parts and allow for splash lubrication and other desirable features of engine design.

Being built as a complete unit, it is possible for the power truck to have used engine units or complete C frames removed, and new or overhauled C frame engine units installed in their stead under the power truck, with very little difficulty. The engine unit being integral is attached to the power truck transom member 13 at the ball joint 30. At the outer corners of the longitudinal frame members 11, coil springs 31 flexibly support the truck frame above the power units. Additional springs 32 may be employed if desired.

The engines may be conveniently operated with steam pressure, either high or low in value, generated in a boiler that is carried on the vehicle, suitable flexible connections and conduits being provided to convey the steam from the boiler to the truck. Other types of expansible chamber engines, such as those operated by the combustion of gasoline or oils at high or low operating pressures may obviously be substituted for the steam engines shown in the drawings.

The ball and socket connection 30 between the C frame and the truck frame (see Fig. 7) comprises a short shaft 33 extending across a recess in the transom 13 and journaled in the latter. A ball 34 is carried on shaft 33 and around it fit two sections 35 and 36 of a hollow sphere. Engine unit cross member 21 has an extension 37 and a band 38 attached thereto which surrounds sections 35 and 36. The latter are held in position around ball 34 by means of rings 39 and 40, secured together by bolts 41.

Guides 50 extend downwardly at the ends of the truck frame 11, into the space enclosed by the cross bar 24 on the ends of the C frame, and adjacent to the buffer surfaces 51 carried on the C frame. These parts co-act to maintain lateral stability and to guide the C frame with respect to the truck frame and vice versa.

To remove the engine unit C frame and replace it with a newly overhauled unit the truck is lifted so as to take the weight of the vehicle off the wheels 25 and off the springs 31, 32. This leaves the wheels 26 resting on the track supporting the engine unit. Next, the short shaft 33 is removed thereby severing the ball socket connection between the truck frame and the C frame. The springs 31 and 32 remain in their sockets on the C frame and are removed therewith. The new C frame is put in place by a reversal of the above steps.

One of the advantages of mounting the engines on the axle is to permit direct connection of the connecting rods to the axle and thereby eliminate the usual gearing.

Figure 5:
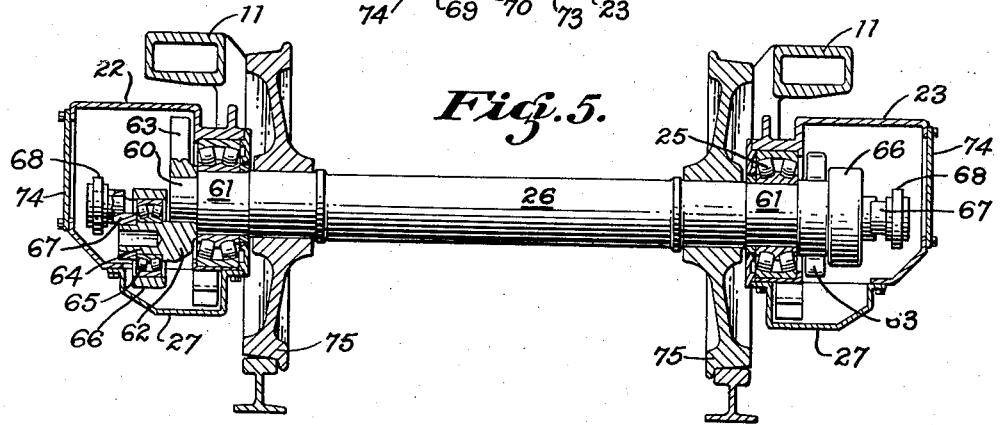
Fig. 5 is a cross section taken on the line 5—5 of Fig. 2.
Figure 6:
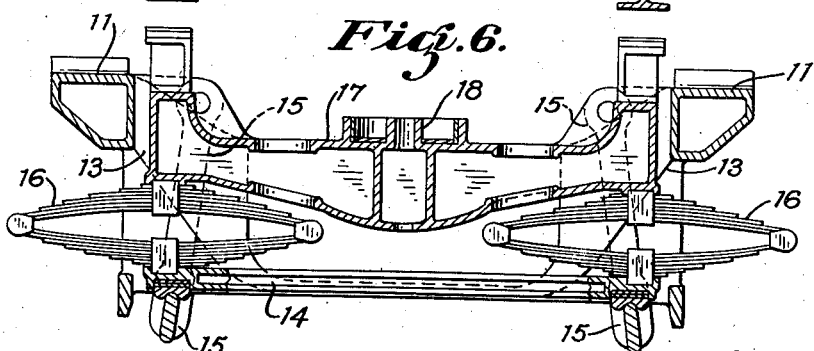
Fig. 6 is a cross section taken on the line 6—6 of Fig. 1.

The self-centering axle journal bearings 25 are mounted in the C frame side members 22 and 23. Each end of the axle 26 has an extension 60 set off-center with relation to the bearing portion 61, to provide an eccentric on which the flying cranks 62 are fastened, as for example, by shrinking. Considerable torque is transmitted to the axle through these cranks and since space is at a premium in each of the crank cases 27 I provide the eccentric extension 60 so as to have the other parts of the flying crank 62 better proportioned considering the heavy loads they must carry. To illustrate, if it were proposed to have a crank with a throw such as shown in Fig. 5, without having the extension 60 set off-center, then it would be necessary to use either a smaller crank pin 64 or a smaller stub extension 60. By arranging the extension 60 off-center opposite to the position of the crank 62 both 60 and 64 can be of larger size.

Each flying crank 62 has the counterweight 63 and the crank pins 64, carrying the self-centering bearing 65 around which fastens the connecting rod cap 66. Also mounted on the end of the crank pin 64, outside the connecting rod bearing, is the driving arm 67 for the valve gear 68.

As shown in Figs. 4 and 5, the cranks 62 on each end of the axle 26 are arranged at an angle of 90°, thereby permitting the smoothest possible application of power to the axle.

The connecting rod 70 is connected at one end to the crank pin 64 and at the other end to pin 71 in the cross head 72. The latter reciprocates in guide 73 (see cut away view in Fig. 4).

The cylinder and valve construction is not shown in detail in the drawings as these follow the conventional practice either for steam engines or internal combustion engines. Cover plates 74 in each C frame side member permits access to the engine.

From this description it will be seen that in each C frame there is a complete engine, axle driving wheels 75, with all of the working parts enclosed within the crank cases 27. Each C frame is suitable to be attached to or detached from the truck frame as a unit, at the ball joint 30.

The cylinders 76 and valve cage (not shown) may be cast integral with C frame or may be made separate and bolted thereto. I prefer to have them bolted thereto so as to permit a change of cylinders for operation with large or small cylinders, as single expansion high pressure engines, or single expansion low pressure engines, or compound.

The point of attachment of each C frame to the main truck is so located with respect to the height and position of the bolster center plate 18 that the couple due to the torque of the engines at their point of attachment 30 will be equal to the couple due to the tractive effort of the truck between the center plate 18 and a horizontal line between the points of attachment 30, so that the pitching movement of the truck frame becomes a propelling force on the car.

This will be found to be so as the force due to the torque of the engines at their point of attachment will be opposite, thus making a couple. This couple will be opposed by the resistance imposed by the weight of the car body at the center plate 18. Consequently, the torque reaction of the engines is converted into propulsive effort at the bolster 17 and the truck frame is relieved of its overturn or pitching moment on a horizontal axis, that is, the tendency of the truck frame to pitch will be resisted by the necessity of accelerating the car body before it can pitch.

Another feature resulting from having the central point of attachment 30 for each C frame to the main truck frame is the lack of "walk" characteristic. In a conventional locomotive the crosshead reaction will tend to swing the boiler from side to side, about a line passing down the center of the locomotive, so that a locomotive when moving slowly will "walk." Where there is a heavy boiler mounted on the frame between the crossheads it will absorb this force, but in the case of a light power truck this crosshead reaction becomes a serious factor since it will tend to lift first one side of the truck and then the other side. By my invention I am able to translate this rocking force into a form of torque reaction, due to the central point of connection of each engine unit to the main truck frame. By tying together the crosshead guides 71, by means of the rigid C frame in which they are mounted, the crosshead reaction is still present but in the form of a twisting force within the C frame. This twisting force acting through the ball joint 30 cannot rock the main frame. The rocking action is eliminated and comes out at the ball joint 30 in the form of a torque reaction.

Another advantage of attaching the engine units to the truck frame as above outlined is that the cylinders and pistons are semi-sprung, resulting from the fact that the engine attachment to the sprung truck frame is between the cylinders so that the cylinders ride with the sprung truck frame. The amount of unsprung weight is thus relatively small.

This complete truck, comprising one or two of the C engine units set under the truck frame provides the maximum of rigidity, good track holding and riding characteristics, coupled with simplicity of design and manufacture and accessibility of all working parts, and complete enclosure from the elements.

In addition, it provides a power unit which can be applied beneath an existing railway vehicle and is completely self-contained, requiring no alteration of said vehicle except the installation of a plant to make the steam, if a steam engine is being used. In the case of an internal combustion engine installation, the vehicle would carry the auxiliaries and fuel and means for starting the truck in motion such as an air compressor set and suitable reserve tanks.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. An engine-driven railway truck comprising, in combination, a truck frame having side and transom members connected together, and engine units pivotally attached to and supporting said truck frame, said engine units each comprising a frame having a cross member and longitudinal side members, wheels and an axle journaled on the outside of the wheels in said last named frame side members, the latter in each instance constituting the engine casing containing all the working parts of a reciprocating engine and the axle journal bearings, means for transmitting the power impulses of said engine to the end of said axle.

2. An engine-driven railway truck comprising, in combination, a truck frame having side and transom members connected together, engine units pivotally attached to and supporting said truck frame, said engine units each comprising a frame having a cross member and longitudinal side members, wheels and an axle journaled on the outside of the wheels in said frame side members, the latter in each instance constituting the engine casing containing all the working parts of a reciprocating engine and the axle journal bearings, means for transmitting the power impulses of said engine to the end of said axle, and means for holding said engine units in alignment with said truck frame.

3. An engine-driven railway truck comprising, in combination, a truck frame having side and transom members connected together, engine units pivotally attached to and supporting said truck frame, said engine units each comprising a frame having a cross member and longitudinal side members, wheels and an axle journaled on the outside of the wheels in said last named frame side members, the latter in each instance constituting the engine casing containing all the working parts of a reciprocating engine and the axle journal bearings, means for transmitting the power impulses of said engine to the end of said axle, and means riding on said longitudinal side members for resiliently supporting said truck frame.

4. An engine-driven railway truck comprising, in combination, a sprung truck frame having side and transom members connected together, engine units each comprising a frame having a cross member and longitudinal side members, wheels and an axle journaled on the outside of the wheels in said last named frame side members, the latter in each instance constituting the engine casing containing all the working parts of a reciprocating engine and the axle journal bearings, means for transmitting the power impulses of said engine to the end of said axle, means on the cross member for pivotally attaching said engine unit to said truck frame on a line across said truck substantially passing thru the cylinders of said engines, whereby said cylinders are subjected to a minimum of track shocks by being attached to said sprung truck frame, and means riding on said longitudinal side members for resiliently supporting said truck frame.

5. An engine driven railway truck comprising, in combination, a truck frame, sub-frame members pivotally connected on the longitudinal center line to and supporting said truck frame on its coinciding longitudinal center line, each sub-frame member including an axle with outside journal bearings journaled in said sub-frame, a flying crank attached to each end of said axle, pistons suitably connected to said flying cranks, both said cranks, said pistons, and said connecting parts being contained within a housing which each side member of said sub-frame forms, whereby said sub-frame rides on and takes its alignment from said axle.

6. An engine driven railway truck comprising, in combination, a truck frame, sub-frame members pivotally connected on the longitudinal center line to and supporting said truck frame on its coinciding longitudinal center line, an axle journaled in each of said sub-frame members, a flying crank attached to each end of said axle, an engine rigidly mounted on each of said sub-frame members in which said axle is journaled and driving through said cranks, said engines being contained within a housing which each side member of said sub-frame forms, whereby said sub-frame rides on and takes its alignment from said axle.

7. An engine unit adapted to be pivotally placed under and support a railway truck frame said unit comprising a frame having substantially hollow side members rigidly connected by a transverse member, a pair of reciprocating engines mounted on and in said side members, the hollow portions of said members forming crankcases for said engines, a pair of wheels, an axle on which said wheels are mounted, journal bearings for said axle mounted in said side frame members, and driving connections between the axle and said engine through which the power impulses are transmitted.

8. An engine unit adapted to be attached by a universal joint to and support a railway truck frame said unit comprising a frame having substantially hollow side members rigidly connected by a transverse member, a reciprocating engine mounted on and in each of said side members, the hollow portions of said members forming crankcases for said engines, a pair of wheels, an axle on which said wheels are mounted, journal bearings for said axle mounted in said side frame members, and driving connections between the axle and said engine through which the power impulses are transmitted, said hollow side members completely enclosing all the moving parts of said engine and driving connections.

9. An engine-axle drive unit adapted to be placed under and support a railway truck frame, said unit comprising an axle, a pair of wheels set in from the ends of the axle, a rigid frame substantially C shaped, the two arms of the C constituting the engine casings containing all the working parts of a pair of reciprocating engines and journals for the axle bearings, said axle being journaled in said frame arms and the connecting arm of the C longitudinally spaced from said axle constituting the connecting member between the two engines and means formed therewith for connecting the engine axle drive unit to a railway truck frame.

10. An engine unit adapted to be placed under and support a railway truck frame said unit comprising reciprocating engines, a frame having side members which house said engines, an axle journaled in said side members, cranks on the ends of said axle operatively connected to said engines, and connecting means mounted on the longitudinal center line of said engine unit frame whereby it can be pivotally connected to said railway truck frame.

11. In an engine crank adapted to be removably secured to the end of a shaft where the diameter of throw of the crank approximates the diameter of said shaft, the combination of a shaft, a stub portion turned off-center on the end of said shaft, a crank having a crank pin shaft and a hole to fit said stub portion, said crank being securely fastened thereto with the off-set stub portion directly opposite said crank pin.

12. An engine unit assembly, adapted to be placed under and support a railway truck frame, said unit comprising a C frame which carries an engine in each side member driving an axle also journaled in said side members, said frame side members providing a sealed case containing all the driving parts and a connecting member longitudinally spaced from said axle.

13. An engine-driven railway truck comprising, in combination, a truck frame having side and transom members connected together, engine units attached to and supporting said truck frame, said engine units each comprising a frame having a cross member and longitudinal side members, wheels and an axle journaled on the outside of the wheels in said last named frame side members, the latter in each instance constituting the engine casing containing all the working parts of a reciprocating engine and the axle journal bearings, means for transmitting the power impulses of said engine to the end of said axle, and means for pivotally accomplishing said attachment of said engine units to said truck frame on its longitudinal center line whereby the crosshead forces of the engine units can act only upon the truck frame on its center line.

14. An engine driven railway truck comprising in combination a truck frame having a bolster center plate, side and transom members connected together, sub-frame members pivotally attached to and supporting said truck frame, an axle journaled in each sub-frame member, a flying crank attached to each end of said axle and engines rigidly mounted in and forming a part of each sub-frame side member which take their alignment from and ride with the axle, means on said sub-frame and on said transom member for attachment together at such a position on the longitudinal center line of the truck that the couple, due to the torque of the sub-frame engines at their points of attachment, will be equal and oppositely directed to the couple due to the tractive effort of the truck between a plane through the said bolster center plate and a horizontal plane between the points of sub-frame attachment, so that the pitching movement of the truck frame becomes a propelling force on the vehicle.

15. The device of claim 1 wherein the power impulses of said engine are transmitted to the end of said axle by a crank, the throw of which approximates the diameter of the axle, including a stub portion turned off-center on the end of said axle, a crank having a crank pin shaft and a hole to fit said stub portion, said crank being securely fastened thereto, with said crank pin directly opposite to the stub portion and on a line passing through the center of said axle.

16. The device of claim 8, wherein the driving connections between the axle and the engine through which the power impulses are transmitted include a crank having a small throw compared with the diameter of the said axle, an off-center projection at the end of said axle, a crank arm fitted to said projection and a crank pin secured to said crank arm in a position to give said crank pin substantially the minimum throw possible.

17. The device of claim 13 wherein the means for transmitting the power impulses of said engine to the end of said axle include a stub portion turned off-center on the end of said axle, a crank, the throw of which approximates the diameter of the said axle, having a crank pin shaft and a hole to fit said stub portion, said crank being securely fastened thereto with said crank pin directly opposite the stub portion and on a line passing through the center of said axle.

18. An engine driven railway truck comprising in combination, a truck frame having side and transom members connected together, a wheeled axle for supporting one portion of said frame and a unit attached to and supporting the other portion of said truck frame, said unit comprising a frame having a cross-member and longitudinal side members, wheels, and an axle journaled on the outside of the wheels in said last named frame members, the latter being adapted to encase all the working parts of a reciprocating engine and the axle journaled bearings, engines in said unit, and means for transmitting the power impulses of said engines at the end of the axle.

19. An engine driven railway truck comprising in combination a truck frame having side and transom members connected together, a wheeled axle for supporting one portion of said frame on the track and a unit attached by a universal joint to and supporting the other portion of said truck frame, said unit comprising a frame having a cross member and longitudinal side members, wheels, and an axle journaled on the outside of the wheels in said last named frame members, the latter being adapted to encase all of the working parts of a reciprocating engine and the axle journal bearings, engines in said unit and means for transmitting the power impulses of said engines at the end of the axle.

WILLIAM J. BESLER.